(12) United States Patent
Owen

(10) Patent No.: US 12,024,256 B1
(45) Date of Patent: Jul. 2, 2024

(54) LIGHT-UP HANDLE GRIP

(71) Applicant: Radical Sportech LLC, Taipei (TW)

(72) Inventor: Neil Owen, Dongguan (CN)

(73) Assignee: RADICAL SPORTECH LLC, Taipei (TW)

( * ) Notice: Subject to any disclaimer, the term of this patent is extended or adjusted under 35 U.S.C. 154(b) by 0 days.

(21) Appl. No.: 18/527,758

(22) Filed: Dec. 4, 2023

(51) Int. Cl.
| | |
|---|---|
| *B62J 6/26* | (2020.01) |
| *B62K 21/26* | (2006.01) |
| *F21S 43/50* | (2018.01) |
| *F21V 23/02* | (2006.01) |
| *F21V 23/04* | (2006.01) |
| *F21W 103/10* | (2018.01) |
| *F21W 107/13* | (2018.01) |

(52) U.S. Cl.
CPC .................. *B62J 6/26* (2020.02); *B62K 21/26* (2013.01); *F21S 43/50* (2018.01); *F21V 23/023* (2013.01); *F21V 23/04* (2013.01); *F21W 2103/10* (2018.01); *F21W 2107/13* (2018.01)

(58) Field of Classification Search
CPC . B62J 6/22–26; B62K 21/26; F21S 43/50–51; F21V 23/023–04; F21W 2103/10; F21W 2107/13–17
See application file for complete search history.

(56) References Cited

U.S. PATENT DOCUMENTS

2010/0053984 A1* 3/2010 Wang ................ B62J 6/015
362/474

* cited by examiner

*Primary Examiner* — Jason M Han

(74) *Attorney, Agent, or Firm* — Muncy, Geissler, Olds & Lowe, P.C.

(57) ABSTRACT

A light-up handle grip is provided, wherein the light-up handle grip includes: a grip sleeve; a light housing, at least a portion of the light housing being light-penetrable, the light housing including a receiving room and a connection end portion, the connection end portion and the grip sleeve being integrally and non-detachably connected to each other in a mutually embedded manner; a light assembly received in the light housing and including at least one lighting member and a switch, the switch being connected to the at least one lighting member to control the at least one lighting member, light from the at least one lighting member being capable of passing through the light housing; and an operation member movably mounted to the light housing, operation of the operation member actuating the switch to turn on or turn off the at least one lighting member.

10 Claims, 5 Drawing Sheets

LIGHT-UP HANDLE GRIP

BACKGROUND OF THE INVENTION

Field of the Invention

The present invention relates to a handle grip, and particularly to a light-up handle grip.

Description of the Prior Art

Vehicles such as scooters, bicycles and motorcycles each include a steering mechanism. Through the steering mechanism, the steering mechanism can for make a turn according to the required direction during moving. Usually, a handle grip is additionally sleeved on a handle bar of the steering mechanism for providing a comfortable and stable grip.

Taking the scooter as an example, it has become a widely used portable vehicle, sports equipment or entertainment device. However, the handle grip of the conventional scooter does not include any warning or decorative mechanism, so the safety and visual effects are very insufficient. Especially, when riding at night, the lack of optical warning function can easily cause danger.

The present invention is, therefore, arisen to obviate or at least mitigate the above-mentioned disadvantages.

SUMMARY OF THE INVENTION

The main object of the present invention is to provide a light-up handle grip which has a simple structure and high strength, is easy to manufacture, and is conducive to reducing costs and to mass production.

To achieve the above and other objects, a light-up handle grip is provided, wherein the light-up handle grip includes: a grip sleeve configured to be sleeved on a handle bar; a light housing, at least a portion of the light housing being light-penetrable, the light housing including a receiving room and a connection end portion, the connection end portion and the grip sleeve being integrally and non-detachably connected to each other in a mutually embedded manner; a light assembly received in the light housing and including at least one lighting member and a switch, the switch being connected to the at least one lighting member to control the at least one lighting member, light from the at least one lighting member being capable of passing through the light housing; and an operation member movably mounted to the light housing, operation of the operation member actuating the switch to turn on or turn off the at least one lighting member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
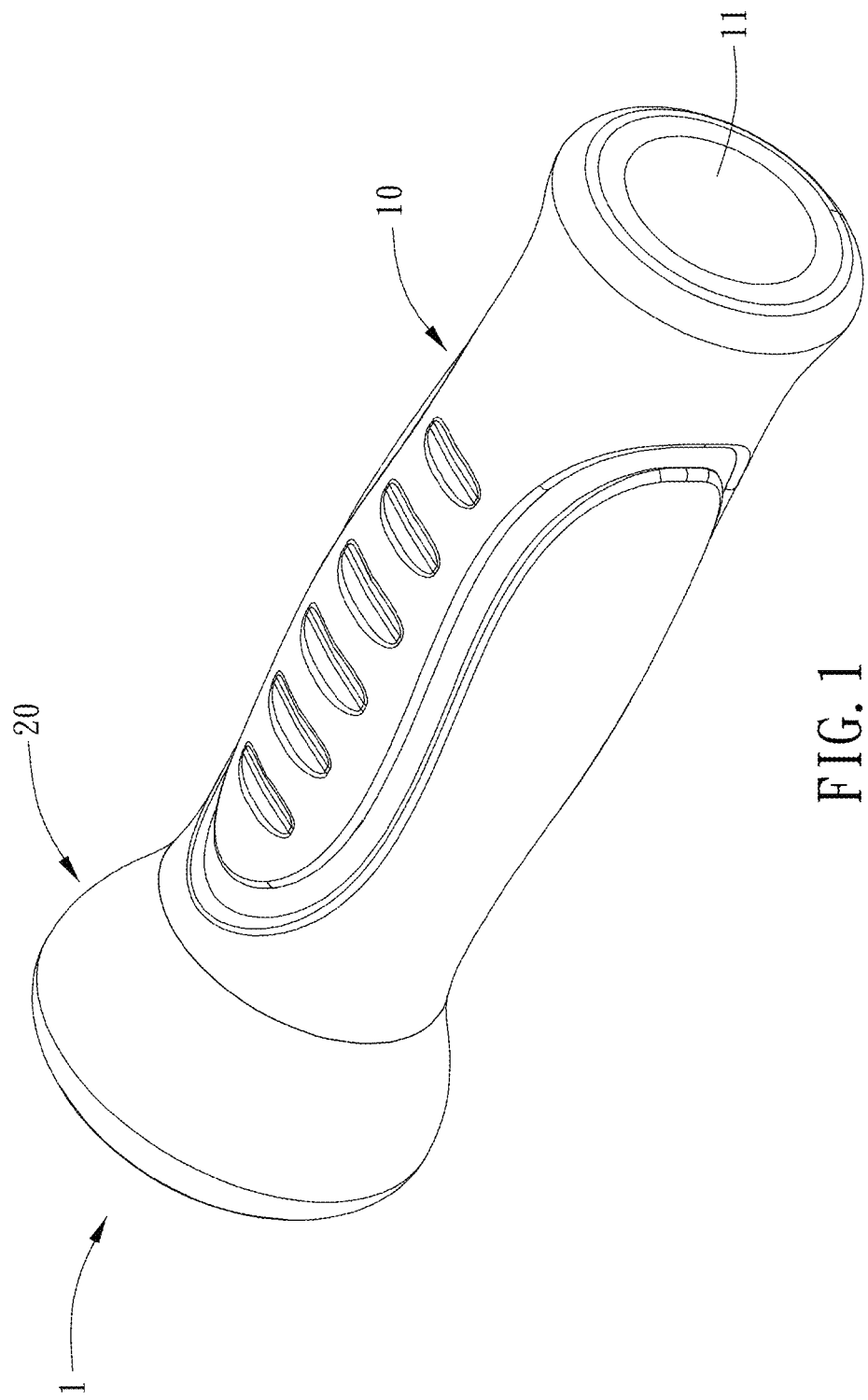
FIG. 1 is a perspective view of an exemplary embodiment of the present invention.
Figure 2:
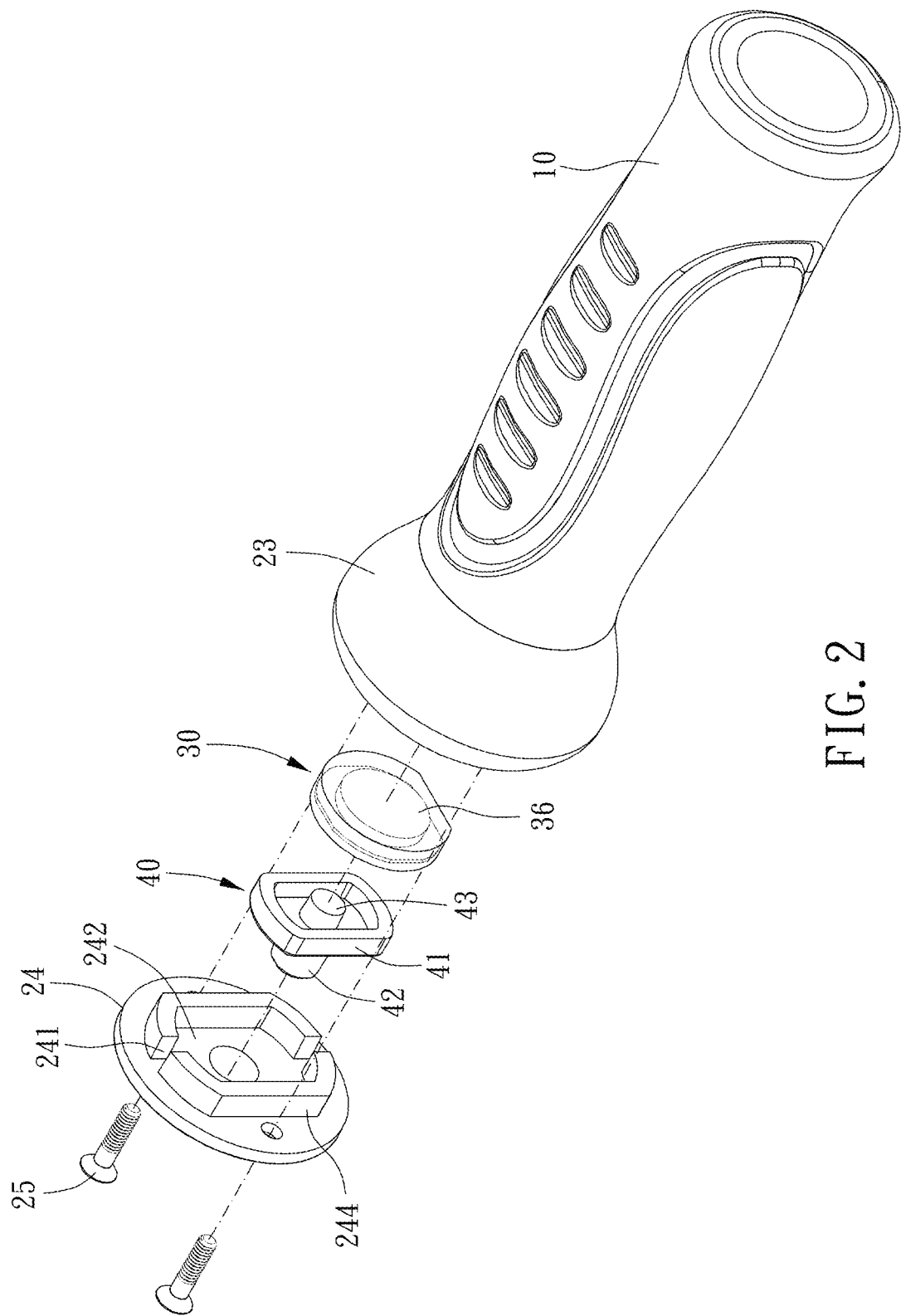
FIG. 2 is a breakdown drawing of an exemplary embodiment of the present invention.
Figure 3:
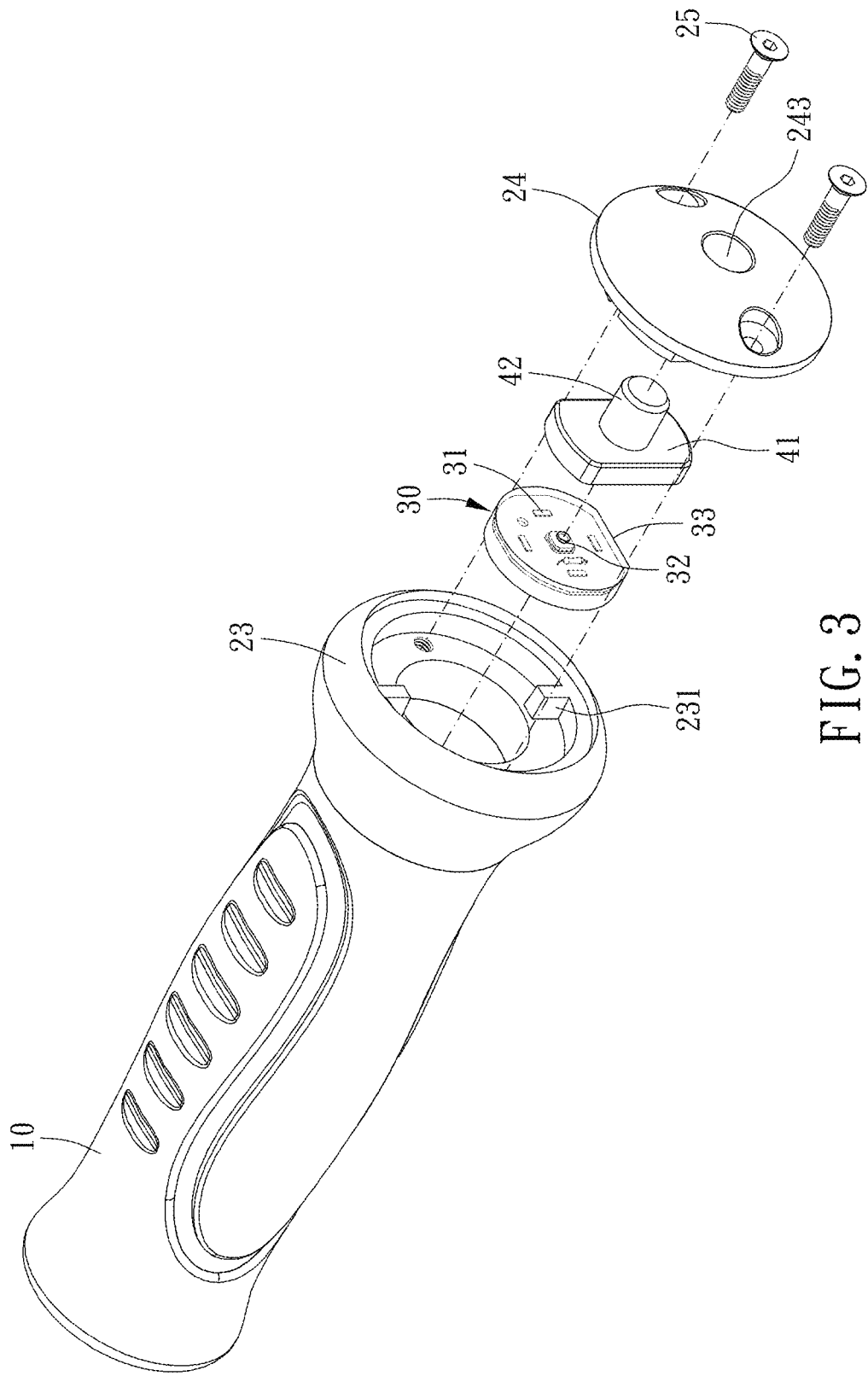
FIG. 3 is another breakdown drawing of an exemplary embodiment of the present invention.
Figure 4:
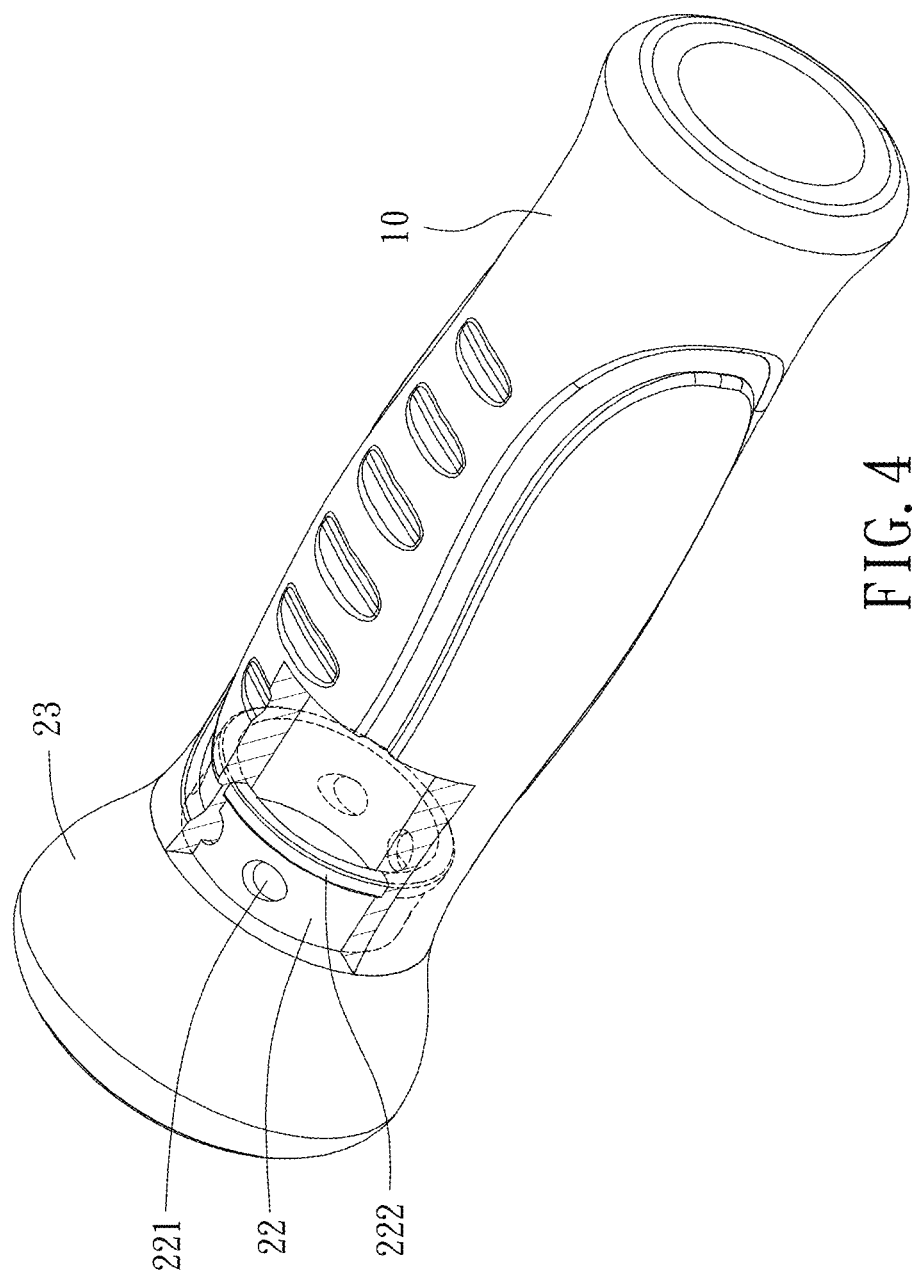
FIG. 4 is a perspective view with a partial cross-sectional region according to an exemplary embodiment of the present invention.
Figure 5:
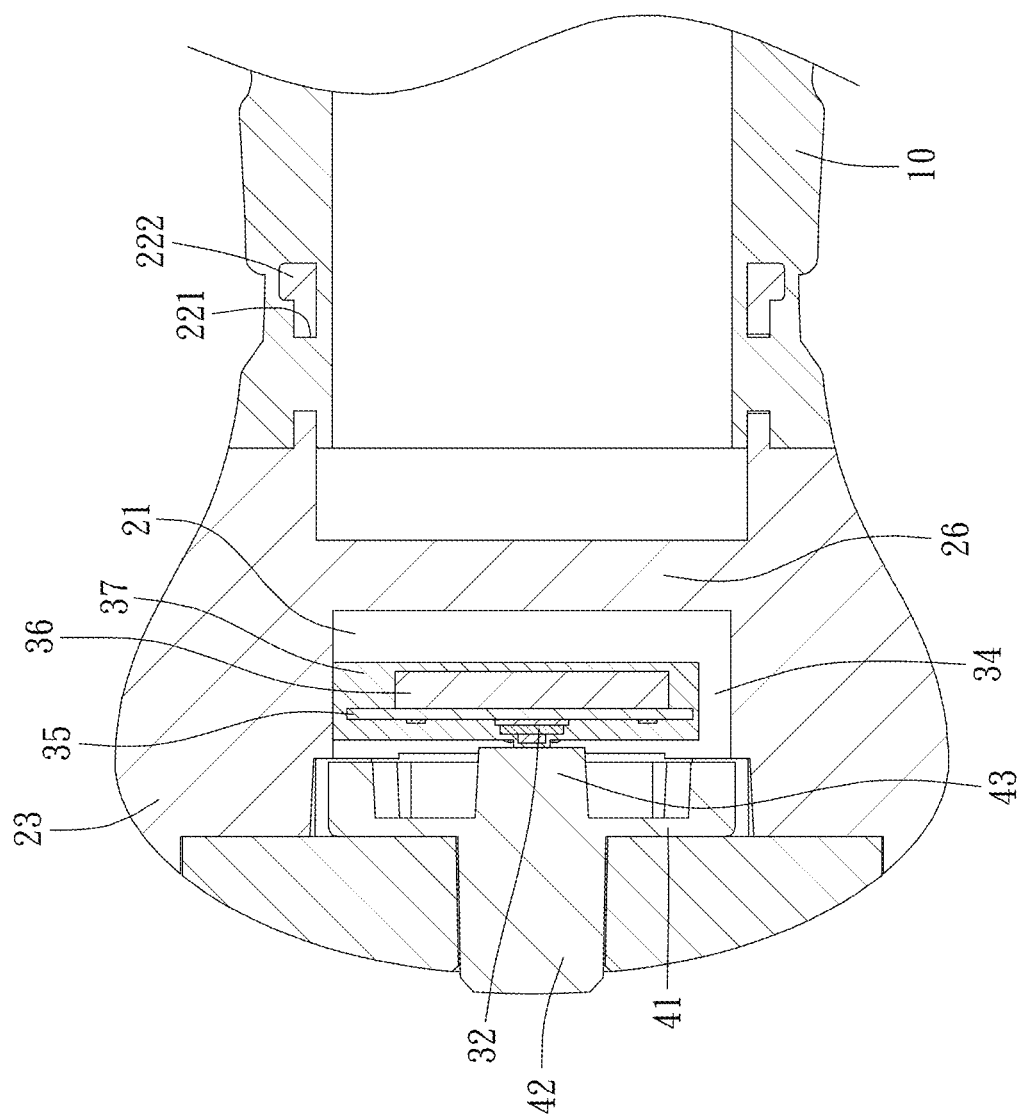
FIG. 5 is a partial cross-sectional view of an exemplary embodiment of the present invention.

Please refer to FIGS. 1 to 5 for an exemplary embodiment of the present invention. A light-up handle grip 1 of the present invention includes a grip sleeve 10, a light housing 20, a light assembly 30 and an operation member 40.

The grip sleeve 10 is configured to be sleeved on a handle bar of a vehicle such as a scooter, bicycle, motorcycle or the like. At least a portion of the light housing 20 is light-penetrable (translucent or transparent), the light housing 20 includes a receiving room 21 and a connection end portion 22, and the connection end portion 22 and the grip sleeve 10 are integrally and non-detachably connected to each other in a mutually embedded manner (for example, the grip sleeve 10 is melted to disposed around the connection end portion 22 by injection molding). The light assembly 30 is received in the light housing 20, the light assembly 30 includes at least one lighting member 31 and a switch 32, the switch 32 is connected to the at least one lighting member 31 to control the at least one lighting member 31, and light from the at least one lighting member 31 is capable of passing through the light housing 20. The operation member 40 is movably mounted to the light housing 20, and operation of the operation member 40 actuates the switch 32 to turn on or turn off the at least one lighting member 31. As such, the integrally-connected configuration of the grip sleeve 10 and the light housing 20 has a simple structure and high strength, is easy to manufacture, and is conducive to reducing costs and to mass production. Moreover, the integrally-connected light housing 20 also serves as a light-penetrable lampshade, which does not require additional processing and assembling process.

The grip sleeve 10 and the light housing 20 are made of different materials. The grip sleeve 10 is not light-penetrable in this embodiment. The grip sleeve 10 may be made of rubber and has better gripping effect. The light housing 20 may be made of plastic so that it provides good strength and protection. However, the grip sleeve 10 and the light housing 20 may be made of other materials or made of a same material according to various requirements.

Preferably, the connection end portion 22 is annularly encompassed by the grip sleeve 10. In this embodiment, inner and outer surfaces of the connection end portion 22 is annularly encompassed by the grip sleeve 10, the connection end portion 22 includes a plurality of through holes 221, the grip sleeve 10 encompasses the connection end portion 22 and fills up the plurality of through holes 221, a distal end of the connection end portion 22 includes a flange 222 projecting radially outward, and the flange 222 is entirely embedded in the grip sleeve 10. As such, it has strong connection of the grip sleeve 10 and the light housing 20.

The light housing 20 further includes a shade body 23 and a cover 24, the shade body 23 includes the connection end portion 22, the cover 24 is covered on the shade body 23 and defines the receiving room 21 with the shade body 23, the operation member 40 is movably mounted to the cover 24, and the cover 24 and the shade body 23 are connected to each other, for example, by at least one fastener 25. Specifically, an inner side of the shade body 23 includes at least one (preferably a plurality of) rib 231, the cover 24 includes at least one (preferably a plurality of) slot 241, the at least one rib 231 is engaged in the at least one slot 241, so that the cover 24 and the shade body 23 can be stably combined.

The cover 24 further includes a chamber 242 and a perforation 243 in communication with the chamber 242, and the operation member 40 is partially received in the chamber 242 and inserted in the perforation 243. The light housing 20 further includes a partition wall 26, the partition wall 26 is located between the receiving room 21 and a mounting hole 11 of the grip sleeve 10, and the partition wall 26 is configured to guide the light from the at least one lighting member 31 so that the light from the at least one lighting member 31 can be guided to various portions of the light housing 20 evenly. In this embodiment, the cover 24 further includes two side walls 244, the two side walls 244 define the chamber 242, ends of the two side walls 244 form the at least one slot 241 therebetween, the at least one slot 241 is in communication with the chamber 242, the operation member 40 includes a base 41, a knob 42 extending form the base 41 and protrusive beyond the perforation 243, and a leg 43 extending form the base 41 toward the switch 32 and opposite to the switch 32. By pressing the knob 42, the switch 32 can be accurately operated by the leg 43.

Preferably, the light assembly 30 is secured in the receiving room 21 in a tight fit manner, which is easy and quick to assemble. The light assembly 30 further includes a chamfered portion 33, and there is a space 34 between the chamfered portion 33 and an inner surface of the receiving room 21 so that the light assembly 30 can be removed easily. The light assembly 30 further includes a circuit board 35, a battery 36 and an encapsulating member 37 which is light-penetrable. The circuit board 35 is electrically connected to the at least one lighting member 31, the switch 32 and the battery 36. The encapsulating member 37 encompasses the circuit board 35, the at least one lighting member 31, the switch 32 and the battery 36, for protecting these electronic components and providing good moisture-proof effect. Preferably, the light assembly 30 may include a plurality of lighting members 31 that can emit lights of different colors. Through the control of the control circuit on the circuit board 35, the plurality of lighting members 31 can emit light at the same time, not at the same time, continuously or intermittently, providing good and various warning and lighting visual effects.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A light-up handle grip including:
a grip sleeve configured to be sleeved on a handle bar;
a light housing, at least a portion of the light housing being light-penetrable, the light housing including a receiving room and a connection end portion, the connection end portion and the grip sleeve being integrally and non-detachably connected to each other in a mutually embedded manner;
a light assembly received in the light housing and including at least one lighting member and a switch, the switch being connected to the at least one lighting member to control the at least one lighting member, light from the at least one lighting member being capable of passing through the light housing; and
an operation member movably mounted to the light housing, operation of the operation member actuating the switch to turn on or turn off the at least one lighting member.

2. The light-up handle grip of claim 1, wherein the connection end portion is annularly encompassed by the grip sleeve.

3. The light-up handle grip of claim 1, wherein the connection end portion includes a plurality of through holes, and the grip sleeve encompasses the connection end portion and fills up the plurality of through holes.

4. The light-up handle grip of claim 1, wherein a distal end of the connection end portion includes a flange projecting radially outward, and the flange is entirely embedded in the grip sleeve.

5. The light-up handle grip of claim 1, wherein the light housing further includes a shade body and a cover, the shade body includes the connection end portion, the cover is covered on the shade body and defines the receiving room with the shade body, and the operation member is movably mounted to the cover.

6. The light-up handle grip of claim 5, wherein an inner side of the shade body includes at least one rib, the cover includes at least one slot, the at least one rib is engaged in the at least one slot, the cover further includes a chamber and a perforation in communication with the chamber, and the operation member is partially received in the chamber and inserted in the perforation.

7. The light-up handle grip of claim 6, wherein the cover further includes two side walls, the two side walls define the chamber, ends of the two side walls form the at least one slot therebetween, the at least one slot is in communication with the chamber, and the operation member includes a base, a knob extending form the base and protrusive beyond the perforation, and a leg extending form the base toward the switch and opposite to the switch.

8. The light-up handle grip of claim 1, wherein the light housing further includes a partition wall, the partition wall is located between the receiving room and a mounting hole of the grip sleeve, and the partition wall is configured to guide the light from the at least one lighting member.

9. The light-up handle grip of claim 1, wherein the light assembly is secured in the receiving room in a tight fit manner, the light assembly includes a chamfered portion, and there is a space between the chamfered portion and an inner surface of the receiving room.

10. The light-up handle grip of claim 1, wherein the light assembly further includes a circuit board, a battery and an encapsulating member which is light-penetrable, the circuit board is electrically connected to the at least one lighting member, the switch and the battery, and the encapsulating member encompasses the circuit board, the at least one lighting member, the switch and the battery.

* * * * *